Dec. 16, 1969 M. S. PARK 3,484,095
JEWELER'S BENCH WORK CLAMP
Filed Feb. 8, 1968 3 Sheets-Sheet 1

INVENTOR.
MAURICE S. PARK
BY
ATTORNEYS

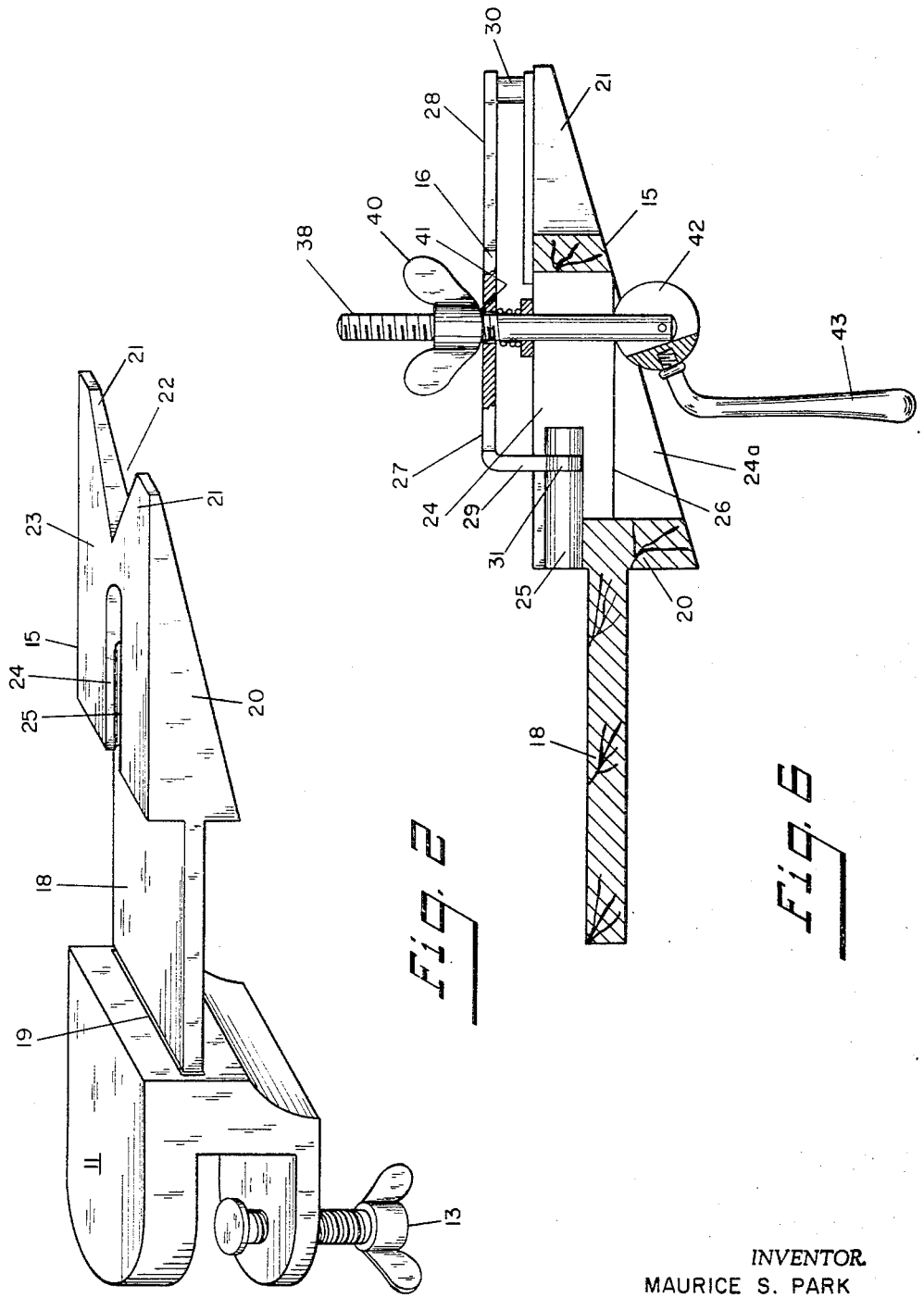

Dec. 16, 1969          M. S. PARK          3,484,095
                JEWELER'S BENCH WORK CLAMP
Filed Feb. 8, 1968                     3 Sheets-Sheet 3

INVENTOR.
MAURICE S. PARK
BY *Joseph G. Werner*
*John M. Winter*
ATTORNEYS

United States Patent Office 3,484,095
Patented Dec. 16, 1969

3,484,095
JEWELER'S BENCH WORK CLAMP
Maurice S. Park, 1114 E. Johnson St.,
Madison, Wis. 53703
Filed Feb. 8, 1968, Ser. No. 704,071
Int. Cl. B25d 5/06
U.S. Cl. 269—235
6 Claims

ABSTRACT OF THE DISCLOSURE

A work clamp having a wood pin with a tongue portion adapted to be tightly secured in a jeweler's bench anvil. The wood pin has a pair of forwardly extending supporting arms defining a V-shaped work space between them. A forked clamping member has a depending disc-shaped end slideably and pivotably mounted in a cylindrical groove in the wood pin and has a pair of spaced clamping fingers at the other end. The clamping member can be slid forward and backward in the groove and pivoted about both longitudinal and transverse axes. Manually operable tightening mechanism controls the position of and tension on the clamping fingers for holding a workpiece on the supporting arms over the work space.

BACKGROUND OF THE INVENTION

Field of the invention

This invention relates to work clamps and more particularly to a work clamp for a jeweler's anvil.

Description of the prior art

Jeweler's bench anvils and wood pins which are adapted to be attached thereto have been known for many years. However, in using the standard anvil and wood pin, it has been necessary for the jeweler to hold the workpiece on the wood pin with one hand while cutting, sawing or otherwise shaping or working on the piece.

Conventional vises and clamps, such as, carpenter's wood vises are not generally suitable for use by jewelers. The clamping jaws of such vises are not adapted to apply uniform pressure on workpieces of non-uniform thickness and, therefore, they are unsuitable for clamping odd shaped pieces of the valuable and often soft metals that jewelers use. Since the jaws of such vises merely move longitudinally in and out with respect to each other they impart an uneven pressure distribution on a workpiece of tapered cross-section which may dent or otherwise damage a soft metal or permit the workpiece to slip or turn while it is being worked.

One known type of clamping device, such as illustrated in U.S. Patent No. 1,288,112, has a pivotable clamping jaw. However, the jaw pivots only about a single axis and cannot adjust to the configuration of a piece having a tapered cross-section. Since the vise therefore only secures a tapered workpiece at the thickest point, in order to prevent slippage and turning of the workpiece, the jaws would have to be tightened to such a degree that a soft metal piece might be dented, gouged, or otherwise marred by such devices.

SUMMARY OF THE INVENTION

My invention basically comprises a pivotable, forked clamping member in combination with a wood pin of a jeweler's anvil for securely holding a workpiece on both sides of a work space defined by the supporting arms of the wood pin. The clamping member is adjustable longitudinally forward and backward on the wood pin to accommodate workpieces of various sizes and shapes and is tiltable for tightly holding workpieces of non-uniform tapered cross-section. The tension on the clamping member is controlled by a draw member engaged in a manually operable tightening member.

The unique clamping action of my jeweler's work clamp is based on the fact that any three points always remain in one plane. Thus, an important aspect of my invention is that the sliding-universal connection between the clamping member and the wood pin is such that the clamping member is free to tilt to either side during tightening so that workpieces of non-uniform thickness are held with substantially equal pressure on both sides of the work space by the clamping fingers to prevent accidental slipping and turning.

My device permits one to quickly and easily clamp a workpiece to the wood pin of a jeweler's anvil with one hand while holding the workpiece in place with the other hand.

Other objects, features and advantages of my invention will be apparent from the following detailed description taken in conjunction with the accompanying drawings wherein several preferred embodiments are shown for exemplification of the principles of my invention.

BRIEF DESCRIPTION OF THE DRAWINGS

FIGURE 2 is a perspective view showing the wood pin portion of my jeweler's work clamp being inserted into a conventional jeweler's anvil.

FIGURE 6 is a longitudinal section view through the center of a second embodiment of my jeweler's work clamp.

DESCRIPTION OF THE PREFERRED EMBODIMENTS

Figure 1:
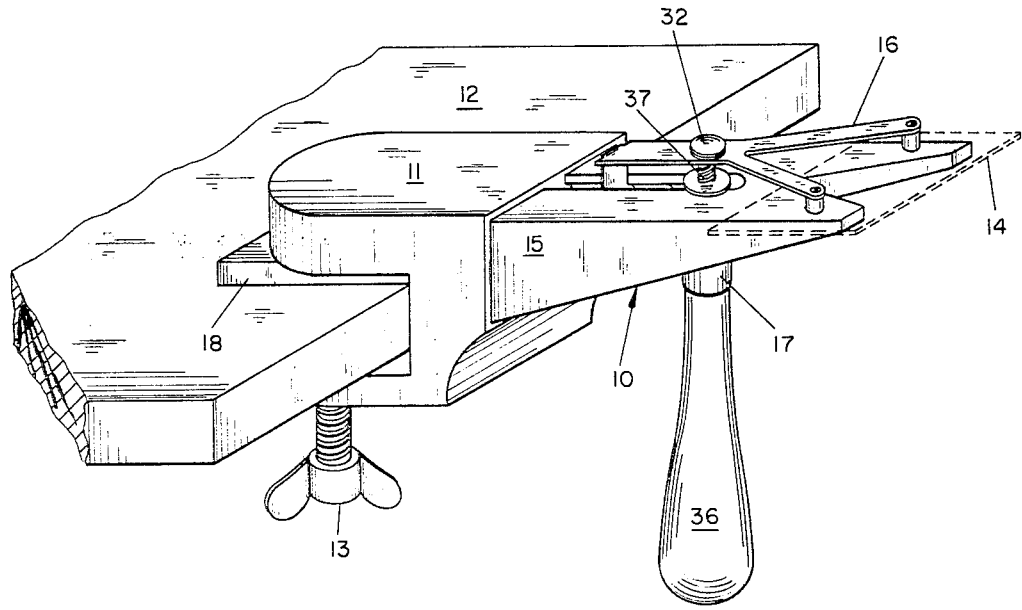
FIGURE 1 is a perspective view of a work clamp in combination with a jeweler's anvil for holding a workpiece shown in dashed lines.

Referring now more particularly to the drawings wherein like numerals refer to like parts throughout the several views, my work clamp is generally shown at 10 in FIGURE 1 mounted in a conventional jeweler's anvil 11 fastened to a bench 12 by a turn screw 13. A workpiece 14 is shown in dashed lines in the clamp. My work clamp 10 is comprised basically of three parts, a wood pin 15, a clamping member 16 and tightening means 17.

It is to be understood that while portion 15 is referred to as a "wood pin," it does not necessarily have to be made of wood. The term "wood pin" has long been used in the jeweler's trade to identify pins of this type which have been made of wood so they would not scratch or mar the precious metals on which the jewelers often worked. Although the term of the art, "wood pin," will be used throughout this application, including the claims, it is understood that it is not intended that the construction of the pin be limited to wood, but it is understood that it could be made of other materials such as, plastic or other synthetic materials.

Figure 4:
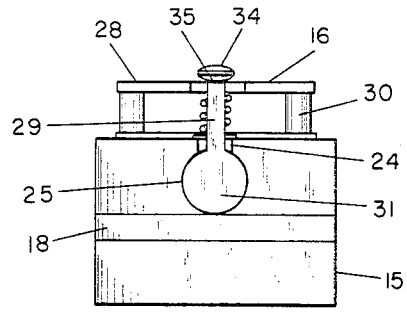
FIGURE 4 is an end view of my jeweler's work clamp holding a flat workpiece.
Figure 5:
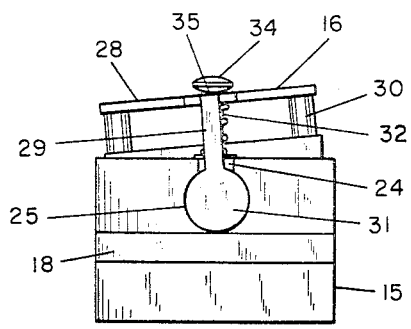
FIGURE 5 is an end view of my jeweler's work clamp holding a workpiece of tapered cross-section.

The wood pin 15 is shown in FIGURE 2 having its tongue portion 18 being inserted into a rectangular slot 19 in the front wall of a conventional jeweler's anvil 11. The wood pin 15 has a body poriton 20 integral with the tongue portion 18. Body 20 has a pair of forwardly extending, spaced supporting arms 21 defining V-shaped work space 22 therebetween. The body portion 20 and the support arms 21 define a flat working surface 23. The body portion of the wood pin has a longitudinally disposed elongate slot 24 extending upward through the body portion and intersecting the working surface 23. The body portion 20 also has a longitudinally disposed substantially cylindrical groove extending from the rear end of the body portion above the tongue portion 18 forwardly in communication with the elongate slot 24. The disposition of the longitudinal slot 24 and cylindrical groove 25 is also shown in FIGURES 4, 5 and 6. As best shown in FIGURE 6, the slot 24 has a widened lower portion 24a defining a substantially horizontal downwardly facing shoulder 26.

Figure 3:
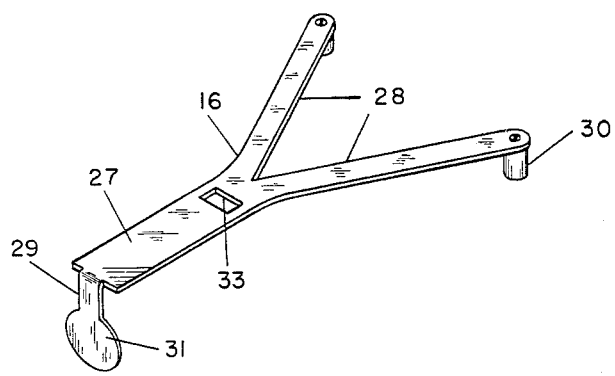
FIGURE 3 is a perspective view of the clamping member of my jeweler's work clamp.

The forked clamping member 16 is best shown in FIGURE 3 and has a main portion 27 integral with a pair of forwardly extending divergent clamping fingers 28 and a depending connector portion 29. The clamping fingers 28 preferably have nonabrasive pads such as shown at 30 for engaging the workpiece without scratching same. The connector end 29 of the clamping member has a disc shaped retainer 31. The retainer disc 31 is just slightly smaller in diameter than the groove 25 as best shown in FIGURES 4 and 5 and is adapted to be slideably and pivotably positioned therein.

The main portion 27 of the clamping member 16 is adjustably secured to the body portion 20 of the wood pin by the tightening mechanism designated generally at 17 in FIGURE 1. The tightening mechanism comprises a threaded draw member 32 extending through a transverse slot 33 in the forward end of the main portion 27 of the clamping member. The head end 34 of the threaded draw member preferably has a somewhat grounded surface 35 on its underside for engaging the top of the main portion 27 of the clamping member adjacent the transverse opening 33 through which the threaded draw member extends. The transverse opening 33 is substantially longer than the diameter of the stem of the threaded draw member so that the clamping member can move from side to side on the draw member as shown in FIGURE 5 when a workpiece of tapered cross-section such as shown at 36 in FIGURE 5 is secured in the work clamp. As best shown in FIGURE 5 the disc shaped retainer portion 31 is free to rotate from side to side in cylindrical groove 25. The longitudinally extending groove 24 must be wide enough to permit the connector end 29 to be pivoted laterally through a rather small arc as shown in FIGURE 5.

The disc shaped retainer portion 31 also acts as the pivot for raising and lowering the clamping fingers 28. The draw member 32 extends downwardly from the clamping member 27 through the elongate slot 24 and is threaded into a manually rotatable handle 36 which engages the downwardly facing bearing shoulder 26. The fingers 28 of the clamping member 16 may, thus, be pivoted upwardly and downwardly by rotating the handle 36 on the threaded draw member 32. A compression spring 37 encircles the stem of threaded draw member 32 for biasing clamping member 16 upwardly toward an open position.

A second form of tightening mechanism is shown in FIGURE 6 wherein a draw member 38 is threaded at its upper portion for receiving a wing-nut 40 thereon. The wing-nut 40 preferably has a rounded bottom surface 41 for engaging the top of the clamping member 16 to permit the clamping member to freely rock thereon. The draw member 38 extends downwardly through slot 24 in the body portion 20 of the wood pin 15 and is eccentrically pinned to the cam head 42. The cam head 42 has a cam lever 43 for rotating the cam head 42 on the downwardly facing bearing shoulder 26 as shown in FIGURE 6. In this form of tightening mechanism, quick on-off pressure is obtained by the cam lever action while pressure adjustment is obtained with wing-nut 40. Both forms of tightening means shown in the drawing permit the clamping member 16 to be moved forwardly and rearwardly on the wood pin. This forward and rear adjustment of the clamping member is limited by the disc shaped retainer portion 31 and the cylindrical groove 25 in which it is held. The cylindrical groove 25 should extend into the body portion 20 of the wood pin only so far as to permit the end of the clamping fingers 28 to reach the outer extremities of the supporting arms 21 of the wood pin.

As best illustrated in FIGURES 4 and 5, the unique sliding-pivot connection between the disc shaped retainer portion 31 of the clamping member and the wood pin permits the clamping member to pivot to either side to facilitate holding of tapered workpieces with equal pressure both sides of the work space to prevent accidental slipping and turning while the piece being held is worked on. The sliding-pivot connection also permits the raising and lowering of the clamping member as well as its adjustment forwardly and rearwardly on the wood pin.

It is understood that my invention is not confined to the particular construction and arrangement of parts herein illustrated and described, but embraces all such modified forms thereof as come within the scope of the following claims.

I claim:
1. A work clamp for mounting in a jeweler's anvil, comprising:
 (a) a wood pin having,
  (i) a tongue portion designed for mounting securely in a jeweler's anvil, and
  (ii) a body portion integral with said tongue portion and having a forwardly extending pair of spaced supporting arms defining a work space therebetween, said body portion and said support arms defining a flat working surface;
 (b) a forked clamping member having,
  (i) a main portion pivotally mounted at one end to the body portion of said wood pin, and
  (ii) a pair of clamping fingers extending out over said supporting arms for securely holding a workpiece on said working surface over said work space; and
 (c) tightening means mounted on said wood pin for drawing said clamping member about its pivotable connection for controlling the tension on said clamping fingers.

2. The work clamp as specified in claim 1 wherein said tightening means comprises:
 (a) a threaded draw member engaging the main portion of said clamping member between said one end thereof and said clamping fingers and extending downwardly therefrom,
 (b) spring means disposed between said clamping member and said body portion biasing said clamping member upwardly away from said working surface, and
 (c) manually turnable means receiving said draw member for pivoting said clamping member downwardly against the force of said spring means towards said working surface.

3. The work clamp as specified in claim 2 wherein said manually turnable means comprises a threaded handle receiving said downwardly extending draw member.

4. The work clamp as specified in claim 2 wherein said manually turnable means comprises a cam pressure lever and wherein a threaded nut is turned on said draw member for fine adjustment of the tension on said clamping fingers.

5. The work clamp as specified in claim 1 wherein the body portion of said wood pin has a longitudinally extending groove therein for pivotally and slideably receiving said one end of the main portion of said clamping member whereby the position of said clamping member can be adjusted longitudinally.

6. The work clamp as specified in claim 1 wherein:
 (a) the body portion of said wood pin has a longitudinally disposed elongate slot extending through the working surface thereof,
 (b) said body portion has a longitudinally extending substantially cylindrical groove therein below said working surface, (c) the main portion of said forked clamping member has a downwardly turned curved retainer portion on end thereof slideably and pivotally engaged in said longitudinally extending groove, and (d) said tightening means extending through said slot in slideable relation and engaging the main portion of said clamping member between said retainer portion and said clamping fingers.

References Cited

UNITED STATES PATENTS

| | | | |
|---|---|---|---|
| 1,536,310 | 5/1925 | Rothlisberger | 269—239 XR |
| 2,727,544 | 12/1955 | MacArthur | 269—239 XR |

ROBERT C. RIORDON, Primary Examiner

D. D. EVENSON, Asisstant Examiner

U.S. Cl. X.R.

83—459; 269—239